United States Patent
Choi et al.

(10) Patent No.: US 10,337,391 B2
(45) Date of Patent: Jul. 2, 2019

(54) DEVICE FOR COOLING AND HEATING UREA SOLUTION FOR CONSTRUCTION MACHINE, AND CONTROL METHOD THEREFOR

(71) Applicants: VOLVO CONSTRUCTION EQUIPMENT AB, Eskilstuna (SE); Dong-Myoung Choi

(72) Inventors: Dong-Myoung Choi, Busan (KR); Yu-Hee Lee, Gyeongsangnam-do (KR); Eun-Geon Yuk, Gyeongsangnam-do (KR); Sung-Hwan Shin, Gyeongsangnam-do (KR); Min-Su Choi, Gyeongsangnam-do (KR)

(73) Assignee: Volvo Construction Equipment AB, Eskiltuna (SE)

(*) Notice: Subject to any disclaimer, the term of this patent is extended or adjusted under 35 U.S.C. 154(b) by 39 days.

(21) Appl. No.: 15/744,911

(22) PCT Filed: Jul. 29, 2015

(86) PCT No.: PCT/KR2015/007958
§ 371 (c)(1),
(2) Date: Jan. 15, 2018

(87) PCT Pub. No.: WO2017/018559
PCT Pub. Date: Feb. 2, 2017

(65) Prior Publication Data
US 2018/0209325 A1     Jul. 26, 2018

(51) Int. Cl.
*F01P 3/18*     (2006.01)
*F01P 7/16*     (2006.01)
(Continued)

(52) U.S. Cl.
CPC .............. *F01P 7/16* (2013.01); *E02F 9/08* (2013.01); *E02F 9/0866* (2013.01);
(Continued)

(58) Field of Classification Search
CPC ........ F01P 7/16; F01P 5/10; F01P 3/18; F01P 3/20; F01P 2007/146; F01P 2060/18;
(Continued)

(56) References Cited

U.S. PATENT DOCUMENTS 7,647,767 B2 *   1/2010   Osaku ................... F01N 3/2066
                                                            60/286
7,966,811 B2 *   6/2011   Reed ..................... F01N 3/2066
                                                            60/274
(Continued)

FOREIGN PATENT DOCUMENTS

DE        19935920 A1    3/2001
DE     102010029269 A1   12/2011
(Continued)

OTHER PUBLICATIONS

European Search Report (dated Mar. 21, 2018) for corresponding European App. EP 15 89 9705.
(Continued)

*Primary Examiner* — Patrick D Maines
*Assistant Examiner* — Dapinder Singh
(74) *Attorney, Agent, or Firm* — WRB-IP LLP

(57) ABSTRACT

A device for cooling and heating a urea solution to be injected into exhaust gas discharged from an engine in order to reduce nitrogen oxides in the exhaust gas includes an engine including a cooling fan, a coolant pump, and a main cooler; a urea solution tank storing the urea solution and having an embedded heat exchange pipe through which first coolant and second coolant circulates; an additional coolant tank storing the second coolant; a water pump supplying the
(Continued)

second coolant from the additional coolant tank to the heat exchange pipe; a valve configured to be opened or closed in order to supply the first coolant and the second coolant to the heat exchange pipe through a supply line, and to move the first coolant and the second coolant, which are discharged from the heat exchange pipe through a discharge line, to rise coolant pump and the additional coolant tank, respectively and a controller for supplying the second coolant to the heat exchange pipe through the supply line when the urea solution temperature exceeds a set temperature and for supplying the first coolant to the heat exchange pipe through the supply line when the urea solution temperature is below or equal to the set temperature, and opening or closing the valve.

12 Claims, 4 Drawing Sheets

(51) Int. Cl.
  *F01N 3/20* (2006.01)
  *F01N 13/08* (2010.01)
  *E02F 9/08* (2006.01)
  *F01N 3/28* (2006.01)
  *E02F 9/20* (2006.01)
  *F01P 3/20* (2006.01)
  *F01P 5/10* (2006.01)
  *F01P 7/14* (2006.01)

(52) U.S. Cl.
  CPC .......... *E02F 9/0883* (2013.01); *E02F 9/2095* (2013.01); *F01N 3/20* (2013.01); *F01N 3/2066* (2013.01); *F01N 3/28* (2013.01); *F01N 13/08* (2013.01); *F01P 3/18* (2013.01); *F01P 3/20* (2013.01); *F01N 2590/08* (2013.01); *F01N 2610/02* (2013.01); *F01N 2610/10* (2013.01); *F01N 2610/11* (2013.01); *F01N 2610/14* (2013.01); *F01N 2610/144* (2013.01); *F01N 2610/1473* (2013.01); *F01N 2610/1486* (2013.01); *F01N 2900/1811* (2013.01); *F01P 5/10* (2013.01); *F01P 2007/146* (2013.01); *F01P 2060/18* (2013.01); *Y02T 10/24* (2013.01)

(58) Field of Classification Search
  CPC ......... E02F 9/08; E02F 9/0866; E02F 9/0883; E02F 9/2095; F01N 3/20; F01N 3/28; F01N 3/2066; F01N 13/08; F01N 2610/02; F01N 2610/10; F01N 2610/11; F01N 2610/14; F01N 2610/144; F01N 2610/1473; F01N 2610/1486; F01N 2590/08; F01N 2900/1811; Y02T 10/24
  USPC .......................... 60/274, 277, 286, 295, 301
  See application file for complete search history.

(56) References Cited

U.S. PATENT DOCUMENTS

| | | | | |
|---|---|---|---|---|
| 8,561,392 | B2 * | 10/2013 | Ogunleye | ............... F01N 3/208 60/286 |
| 8,959,903 | B2 * | 2/2015 | Myer | ................... F01N 3/2066 60/303 |
| 2007/0079599 | A1 * | 4/2007 | Osaku | ................... F01N 3/2066 60/283 |
| 2010/0162690 | A1 | 7/2010 | Hosaka et al. | |
| 2013/0074479 | A1 | 3/2013 | Ryoo et al. | |

FOREIGN PATENT DOCUMENTS

| | | |
|---|---|---|
| EP | 1662103 A1 | 5/2006 |
| EP | 2754870 A1 | 7/2014 |
| JP | 2011241734 A | 12/2011 |
| KR | 101278574 A | 6/2013 |
| KR | 1020140014497 A | 2/2014 |

OTHER PUBLICATIONS

International Search Report (dated Mar. 29, 2016) for corresponding International App. PCT/KR2015/007958.

* cited by examiner

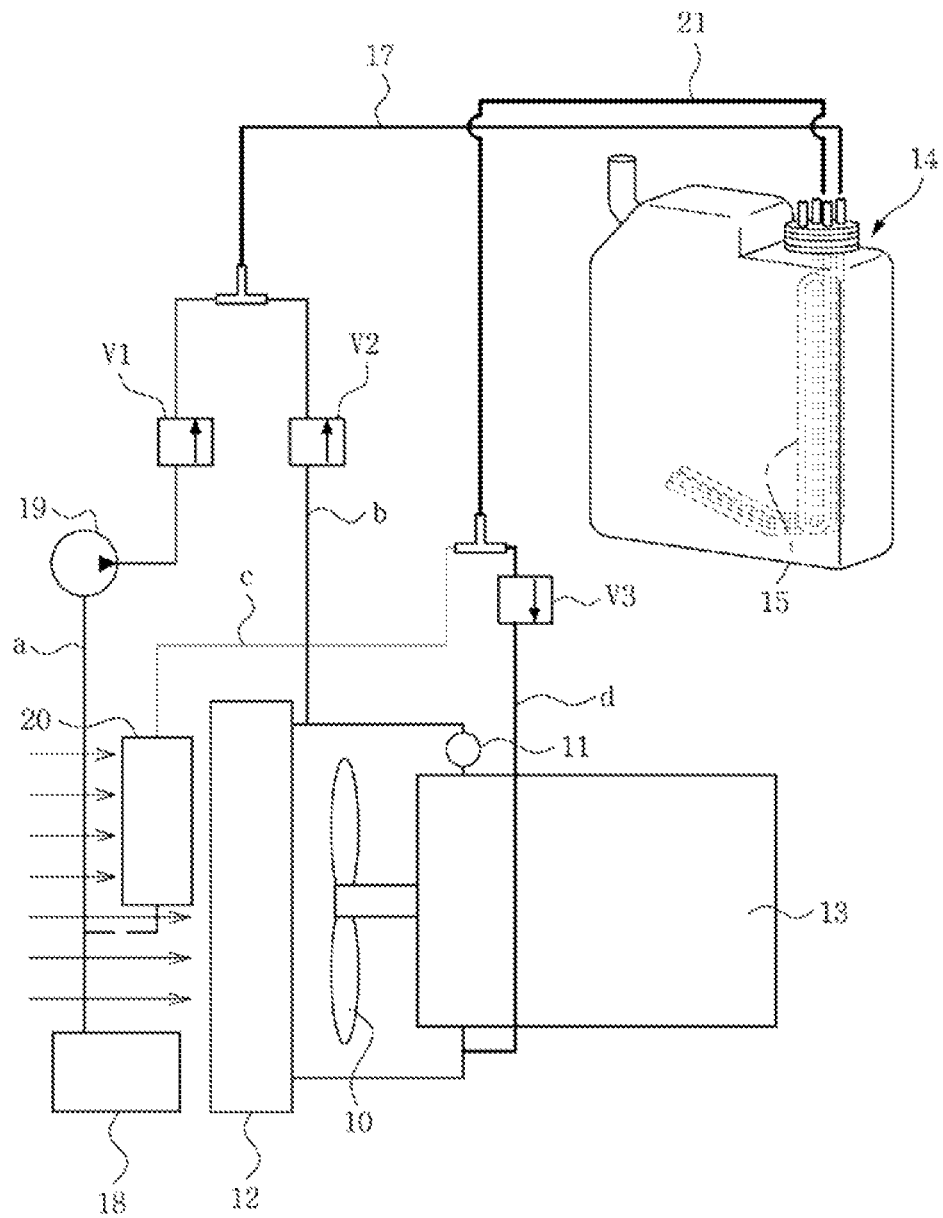
[Fig. 1]

[Fig. 2]
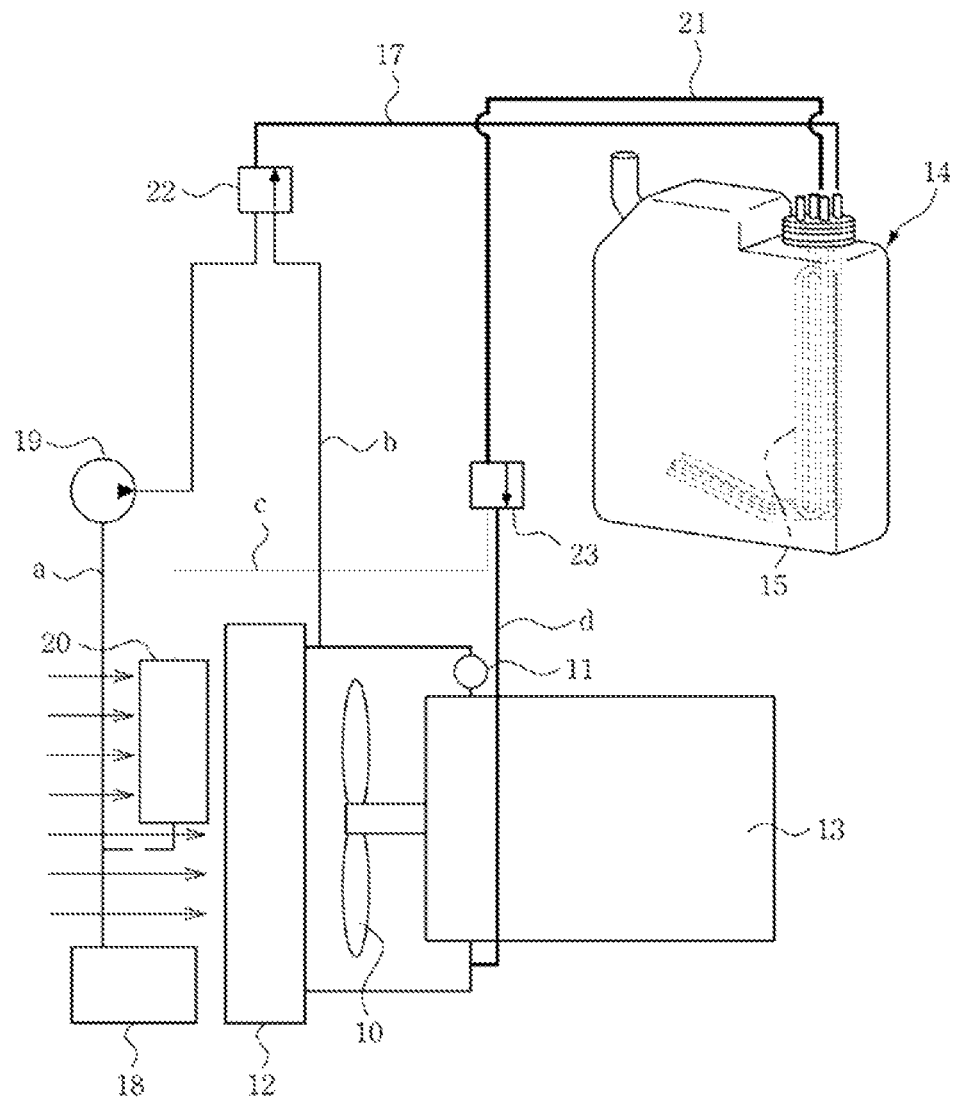

[Fig. 3]
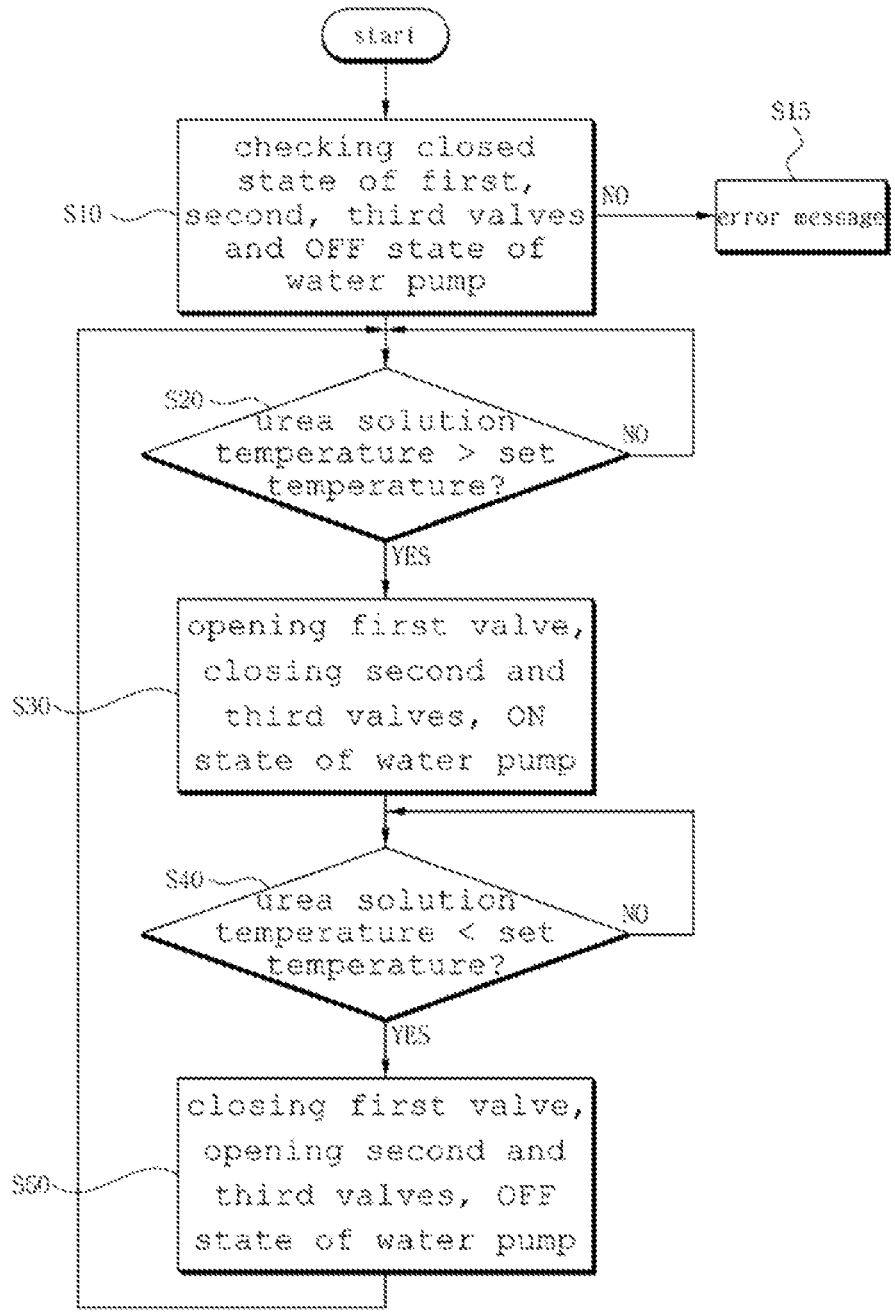

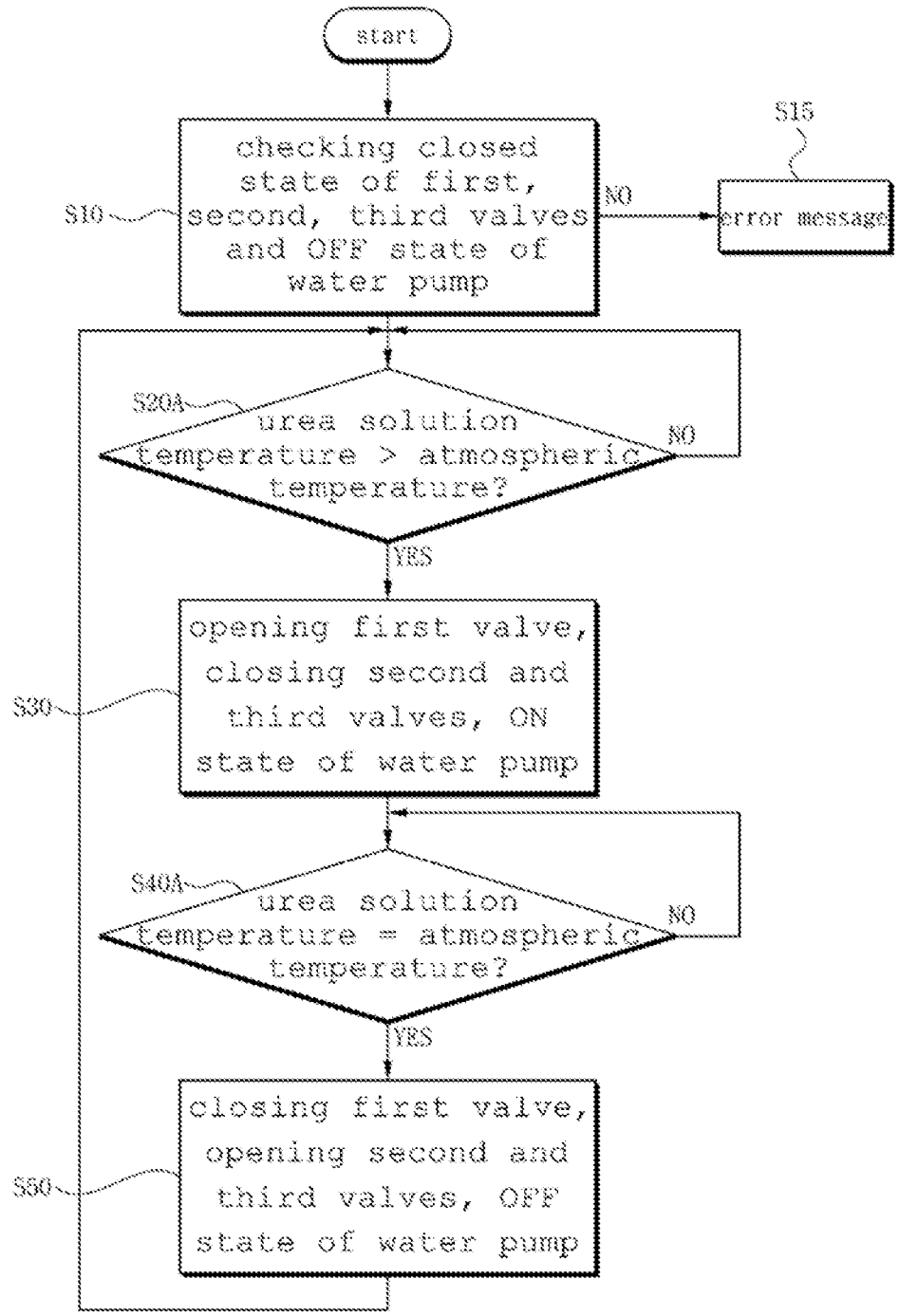
[Fig. 4]

DEVICE FOR COOLING AND HEATING UREA SOLUTION FOR CONSTRUCTION MACHINE, AND CONTROL METHOD THEREFOR

BACKGROUND AND SUMMARY

The present invention relates to a device for cooling and heating a urea solution. More particularly, the present invention relates to a device for cooling and heating a urea solution for a construction machine, and a control method therefor, which are configured to reduce nitrogen, oxides in exhaust gas discharged from an engine.

According to Tier-4 final emissions regulations for diesel engines in 2014, in order to reduce more nitrogen oxides in exhaust gas through an exhaust pipe, a urea injector mounted on the exhaust pipe receives the urea solution of the urea solution tank by a urea solution pump and injects the urea solution into the exhaust gas, Thus, the nitrogen oxides are converted into $N_2$ and $H_2O$ by catalysis between the urea solution and a selective catalytic reduction (SCR) catalyst, thereby reducing the nitrogen oxides (NOx) in the exhaust gas.

On the other hand, since the urea solution contains much water and the freezing point thereof is $-11°$ C., when the temperature of outside air is low, the urea solution in the urea solution tank is heated to an appropriate temperature before the urea solution tank supplies the urea solution to the urea injector.

When the temperature of the urea solution supplied to the urea injector from the urea solution tank is higher than a set temperature, components of the urea solution vaporize and emit odor. In addition, since chemical reaction occurs and irreversible chemical derivatives are generated due to the vaporization of the area solution, corrosion occurs which affects the durability of related parts such as the urea solution pump.

In contrast, when, the temperature of the urea solution supplied to the urea injector is lower than the set temperature, the urea solution solidifies such that the urea injector is not capable of injecting the urea solution into the exhaust pipe effectively.

In addition, in contract to a truck that moves fast so a urea solution tank thereof is easily cooled by outside air, construction machines such as an excavator operate at the same place or operate while slowly moving so cooling a urea solution tank thereof is not easy.

Furthermore, hot air due to heat exchange with an engine or a hydraulic component of construction machines affects the urea solution tank such that a temperature of a urea solution in the urea solution tank is increased. When such an increased temperature of the urea solution is detected, an error message is delivered to an operator, and then after a predetermined time elapses, the machine is switched into protection, mode to not be operated.

Therefore, workability decreases since the machine does not operate until, the temperature of the urea solution in the urea solution tank falls bellows a preset temperature.

Accordingly, it is desirable to provide a device for cooling and heating a urea solution for a construction machine, the device being configured to maintain the urea solution of a area solution tank at an appropriate temperature since the device maintains the urea solution at the appropriate temperature so an operation of a construction machine can be continuous, thereby improving workability of the construction machine.

In accordance with an aspect of the present invention, a device for cooling and heating a urea solution for a construction machine according to an embodiment of the present invention includes: an engine including a cooling fan, a coolant pump, and a main cooler;

a urea solution tank storing the urea solution and provided with an embedded heat exchange pipe through which first coolant or second coolant circulates;

an additional coolant tank storing the second coolant cooling the urea solution stored in the urea solution tank;

a water pump supplying the second coolant from the additional coolant tank to the heat exchange pipe;

a valve configured to be opened or closed in order to supply the first coolant by driving of the coolant pump and the second coolant of the additional coolant tank by driving of the water pump to the heat exchange pipe of the urea solution tank through a supply line, and in order to move the first coolant and the second coolant, which are heat-exchanged at the heat exchange pipe of the urea solution tank, to the coolant pump and to the additional coolant tank, respectively; and a controller outputting drive signals to a driver of the water pump in order to supply the second coolant of the additional coolant tank by the water pump through the valve and the supply line when a temperature of the urea solution in the urea solution tank exceeds a set temperature and to a driver of the coolant pump in order to supply the first coolant by the coolant pump to the heat exchange pipe of the urea solution tank through the valve and the supply line when the temperature of the urea solution in the urea solution tank is equal to or lower than the set temperature, and opening or closing the valve.

In accordance with an aspect of the present invention, a control method of a device for cooling and heating a urea solution for a construction machine according to another embodiment of the present invention, wherein the device includes: an engine including a cooling fan, a coolant pump, and a main cooler;

a urea solution tank storing the urea solution and provided with an embedded heat exchange pipe through which first coolant or second coolant circulates;

an additional coolant tank storing the second coolant cooling the urea solution stored in the urea solution tank;

a water pump supplying the second coolant from the additional coolant tank to the heat exchange pipe;

an extra cooler dissipating heat of the second coolant; discharged alter heat exchange with the urea solution of the urea solution tank, by heat exchange with outside air;

a temperature sensor detecting a temperature of the urea solution in the urea solution tank;

a first valve configured to supply the second coolant of the additional coolant tank to the heat exchange pipe of the urea solution tank through the supply line;

a second valve configured to supply the first coolant to the heat exchange pipe of the urea solution tank through the supply line;

a third valve configured to discharge the first coolant and the second coolant from the heat exchange pipe of the urea solution tank-through the discharge line after heat, exchange with the urea solution contained therein; and a controller receiving a detection signal of the urea solution in the urea solution tank which is detected by the temperature sensor,.wherein the control method includes:

checking a closed state of the first-valve, the second valve, and the third valve and an OFF state of the water pump;

determining whether the temperature of the urea solution in the urea solution tank detected by the temperature sensor exceeds a set temperature; and opening the first valve and closing the second valve and third valve so as to supply the second coolant of the additional coolant tank to the heat exchange pipe of the urea solution tank through the first valve and the supply line and so as to move the second coolant having exchanged heat with the urea solution of the urea solution tank to the extra cooler through the discharge line when the detected temperature of the urea solution exceeds the set temperature.

According to an aspect of the present invention having above-mentioned construction, the device for cooling and heating the urea solution for the construction machine is configured to maintain the urea solution of the urea solution tank at the appropriate temperature in order to reduce the nitrogen oxides in the exhaust gas, thereby preventing the urea solution from evaporating or degenerating. In addition, the device is configured according to an aspect thereof to inject the urea solution into the exhaust pipe smoothly, thereby reducing nitrogen oxides, and the device is configured to ensure an expensive construction machine can operate continually, thereby improving workability of the machine.

BRIEF DESCRIPTION OF DRAWINGS

FIG. 1 is a diagram showing a device for cooling and heating a area solution for a construction machine according to a first embodiment, of the present invention;

FIG. 2 is a diagram showing a device for cooling and heating a urea solution heating for a construction machine according to a second embodiment of the present invention;

FIG. 3 is a block diagram showing a control method of the device for cooling and heating the urea solution for the construction machine according to the first embodiment of tile present invention; and FIG. 4 is a block diagram showing another control method of the device for cooling and heating the urea solution for the construction machine according to the first embodiment of the present invention.

DESCRIPTION OF THE REFERENCE NUMERALS IN THE DRAWINGS

10; cooling fan
11; coolant pump
12; main cooler
13; engine
14; urea solution tank
15; heat exchange pipe
17; supply line
18; additional, coolant tank
19; water pump
20; extra cooler
21; discharge line
22; first 3-way valve
23; second 3-way valve Detailed Description Hereinafter, a device for cooling and heating a urea solution for a construction machine according to embodiments of the present invention will be described, with reference to the accompanying drawings.

FIG. 1 is a diagram showing a device for cooling and heating a urea solution for a construction machine according to a first embodiment of the present invention, FIG. 2 is a diagram showing a device for cooling and heating a urea solution heating for a construction machine according to a second embodiment of the present invention, FIG. 3 is a block diagram showing a control method of the device for cooling and heating the urea solution for tire construction machine according to the first embodiment of the present invention, and FIG, 4 is a block diagram showing another control method of the device for cooling and heating the urea solution for the construction machine according to the first embodiment of the present invention.

Referring to FIG. 1, the device for cooling and heating a urea solution for a construction machine according to the first embodiment of the present invention includes:

a cooling fan 10, a coolant pump 11, and a main cooler 12, which are provided to a dieseal engine 13.

A urea solution tank 14 storing the urea solution has an embedded heat exchange pipe 15 through which first coolant (indicating engine coolant) or second coolant (indicating coolant having a coolant temperature lower than the engine coolant) circulates. The urea solution tank 14 may be composed of materials such as plastic or stainless steel.

An additional coolant tank 18 storing the second coolant supplied to the heat exchange pipe 15 through a supply line 17 to cool the urea solution in the urea solution tank 14 is connected with the supply line 17 through a coolant supply channel a.

A water pump 19 supplying the second coolant from the additional coolant tank 18 to the heat exchange pipe 15 through the coolant supply channel a and the supply line 17 is mounted on the coolant supply channel a.

An extra cooler 20 dissipates heat of the second coolant, which is supplied to the heat exchange pipe 15 of the urea solution tank 14, exchanges heat with the urea solution contained therein, and then moves to the additional coolant tank 18 through a discharge line 21, by heat exchange with outside air and the extra cooler 20 is mounted on a coolant discharge channel c disposed between the additional coolant tank 18 and the discharge line 21.

A first valve V1 configured to be opened or closed in order to supply the second coolant of the additional coolant tank 18 to the heat exchange pipe 15 of the urea solution tank 14 through the coolant supply channel a and the supply line 17 by driving of the water pump 19 is mounted on the coolant supply channel a.

A second valve V2 configured to be opened or closed in order to supply the first coolant to the heat exchange pipe 15 of the urea solution tank 14 through an engine coolant supply channel b and the supply line 11 by driving of the coolant pump 11 is mounted on the engine coolant supply channel b.

A third valve V3 configured to be opened or closed in order to move the first coolant, which exchanges heat with the urea solution of the urea solution tank 14 and then is discharged from the heat exchange pipe 15 through the discharge line 21, to the coolant pump 11 and to move the second coolant, which exchanges heat with the urea solution of the urea solution tank 14 and that is discharged from the heat exchange pipe 15 through the discharge line 21 and the coolant discharge channel c, to the additional coolant tank 18 is mounted on an engine coolant discharge channel d.

To supply the second coolant of the additional coolant tank 18 to the heat exchange pipe 15 of the urea solution tank 14 through the coolant supply channel a, the first valve V1, and the supply line 17 by driving of the water pump 19 when a temperature of the urea solution in the urea solution tank 14 exceeds a set temperature (20° C. to 60° C. as an example), and to supply the first coolant to the heat exchange pipe 15 of the urea solution tank 14 through the engine coolant supply channel b, the second valve V2, and the supply line 17 by driving of the coolant pump 11 when the temperature of the urea solution in the urea solution tank 14 is equal to or lower than a set temperature (3° C. to 20° C. as an example), a controller is provided to output drive signals to each driver (not shown) of the water pump 19 and the coolant pump 11 and to open or close the first valve V1, the second valve V2, and the third valve V3.

The first valve V1 is configured to be opened when supplying the second coolant from the additional coolant tank 18 to the heat exchange pipe 15 of the urea solution rank 14 through the coolant supply channel a and the supply line 17 by driving of the water pump 19, and the first valve V1 is configured to be closed when supplying the first coolant to the heat exchange pipe 15 of the urea solution tank 14 through the engine coolant supply channel b, the second valve V2, and the supply line 17 by driving of the coolant pump 11.

The second valve V2 is configured to be closed when supplying the second coolant from the additional coolant tank 18 to the heat exchange pipe 15 of the urea solution tank 14 through the coolant supply channel a, the first valve V1, and the supply line 17 by driving of the water pump 19, and the second valve V2 is configured to be opened when supplying the first coolant to the heat exchange pipe 15 of the urea solution tank 14 through the engine coolant supply channel b, the second valve V2, and the supply line 17 by driving of the coolant pump11.

The third valve V3 is configured to move the second coolant, discharged from the heat exchange pipe 15 of the urea solution tank 14 after heat exchange with the urea solution contained therein, to the extra cooler 20 through the coolant discharge channel c when closed to supply the second coolant in the additional coolant tank 18 to the heat exchange pipe 15 of the urea solution tank 14 through the coolant supply channel a, the first valve V1, and the supply line 17, and the third valve V3 is configured to move the first coolant, discharged from the heat exchange pipe 15 of the urea solution tank 14 through the discharge line 21 after heat exchange with the urea-solution contained therein, to the coolant pump 11 through the engine coolant discharge channel d when opened to supply the first coolant to heat exchange pipe 15 of the urea solution tank 14 through the engine coolant supply channel b, the second valve V2, and the supply line 17.

Each of the first valve V1, the second valve V2, and the third valve V3 may be a solenoid valve changing between an initial state closing the coolant supply channel a and the engine coolant supply channel b which are selectively connected with the supply line 17 and the engine coolant discharge channel d connected with the discharge line 21 and an ON state opening the coolant supply channel a, the engine coolant supply channel b, and the engine coolant discharge channel d in response to an electrical signal.

Although not shown in, drawings, the urea solution tank 14 may be provided with a temperature sensor detecting a temperature of the urea solution in the urea solution tank 14 and outputting detection signal to the controller. Those skilled in the art may install the temperature sensor in a desired place inside the urea solution tank 14.

The extra cooler 20 may be disposed in front of the main cooler 12 to be cooled by heat exchange with outside air cooler than outside air supplied to the main cooler 12 by driving of the cooling fan 10.

Referring to FIG. 3, an embodiment of the present invention provides a control method of a device for cooling and heating a urea solution for a construction machine, wherein the device includes:

a cooling fan 10, a coolant pump 11, and a main cooler 12, which are provided to an engine 13;

a urea solution tank 14 storing urea solution and having an embedded heat exchange pipe 15 through which first coolant (indicating engine coolant) or second coolant (indicating coolant cooler than the engine coolant) circulates;

an additional coolant tank 18 storing the second coolant cooling the urea solution stored in the urea solution tank 14;

a water pump 19 supplying the second coolant from the additional coolant tank 18 to the heat exchange pipe 15 through the supply line 17;

an extra cooler 20 dissipating heat of the second coolant, discharged from the heat exchange pipe 15 to the additional coolant tank 18 through an discharge line 21 after heat exchange with the urea solution of the urea solution tank 14, by heat exchange with outside air, thereby cooling the second coolant;

a temperature sensor (not shown) detecting a temperature of the urea solution in the urea solution tank 14;

a first valve V1 configured to be opened or closed in order to supply the second coolant of the additional coolant tank 18 to the heat exchange pipe 15 of the urea solution tank 14 through the supply line 17;

a second valve V2 configured to be opened or closed in order to supply the first coolant to the heat exchange pipe 15 of the urea solution tank 14 through the supply line 17;

a third valve V3 configured to be opened or closed in order to discharge the first coolant and the second coolant from the heat exchange pipe 15 of the urea solution tank 14 to the additional coolant tank 18 and the coolant pump 11, respectively, through the discharge line 21 after heat exchange with the urea solution; and a controller (not shown) receiving a detection signal of the urea solution in the urea solution tank 14 which is detected by the temperature sensor, and wherein the control method includes:

checking a closed state of the first valve V1, the second valve V2, and the third valve V3 and an OFF state of the water pump 19 (S10);

determining whether the temperature of the urea solution in the urea solution tank 14 detected by the temperature sensor exceeds a set temperature (S20);

opening the first valve V1 and closing the second valve V2 and third valve V3 so as to supply the second coolant of the additional coolant tank 18 to the heat exchange pipe 15 of the urea solution tank 14 through the coolant supply channel a, the water pump 19, the first valve V1, and the supply line 17 and so as to move the second coolant having exchanged heat with the urea solution of the urea solution tank 14 to the extra cooler 20 through the discharge line 21 and the coolant discharge channel c when the detected temperature of the urea solution exceeds the set temperature (20° C. to 60° C. as an example) (S30);

determining whether the temperature of the urea solution detected by the temperature sensor is lower than the set temperature (3° C. to 20° C. as an example) (S40); and closing the first valve V1 and opening the second valve V2 and third valve V3 so as to supply the first coolant to the heat exchange pipe 15 of the urea solution tank 14 through the engine coolant supply channel b, the second valve V2, and the supply line 17 and so as to move the first coolant having exchanged heat with the urea solution of the urea solution tank 14 to the coolant pump 11 through the discharge line 21, the third valve V3, and the engine coolant discharge channel d when the detected temperature of the urea solution is lower than the set temperature (S50).

According to the above-mentioned construction, the closed state of the first valve V 1, the second valve V2, and the third valve V3 and the OFF state of the water pump 19 are checked at step S10. At this point, when the first valve V1, the second valve V2, and the third valve V3 are closed and the water pump 19 is in the OFF state, it is determined that the device for cooling and heating the urea solution is in a normal operating condition and the process is proceeded to step S20, whereas when it is determined that the device for cooling and heating the urea solution is in an off-normal operating condition, the process proceeds to step S15.

The off-normal operating condition means a malfunction state where the operating signals from the water pump 19, the first valve V1, the second valve V2, the third valve V3, and the temperature sensor are not input to the controller.

At step S15, when it is in the off-normal operating condition of the device for cooling and heating the urea solution, an error message is shown to an operator through a display (not shown) and then the operator inspects and checks a defective component.

At step S20, tire temperature of the urea solution increases as an inner temperature of the urea solution tank 14 increases due to generated heat by operating the machine. At this point, the detection signal of the temperature of the urea solution in the urea solution tank 14 detected by the temperature sensor installed inside the urea solution tank 14 is input to the controller.

Therefore, it is determined whether the detected temperature of the urea solution in the urea solution tank 14 exceeds the set temperature according to the controller, and when the temperature of the urea-solution-exceeds, the set temperature, the process proceeds to step whereas when the temperature of the urea solution is equal to or lower than the set temperature, determining whether the temperature of the urea solution in the urea solution tank 14 exceeds set temperature is repeated.

At step S30, when the detected temperature of the urea solution exceeds the set temperature, the second coolant in the additional coolant tank 18 is supplied to the heat exchange pipe 15 of the urea solution tank 14, and the first valve V1 is opened, the second valve V2 and the third valve V3 are closed to exchange heat with the urea solution in urea solution tank 14.

Therefore, the second coolant in the additional coolant tank 18 is supplied to the heat exchange pipe 15 of the urea solution tank 14 through the coolant supply channel a, the opened first valve V1, and the supply line 17 by driving of the water pump 19.

The heat exchange between the second coolant supplied to the heat exchange pipe 15 and the urea solution in the urea solution tank 14 cools the urea solution to not exceed the set temperature. The second coolant in the heat exchange pipe 15, exchanges heat with the urea solution in the urea solution tank 14, moves to the extra cooler 20 through the discharge line 21 and the coolant discharge channel c. Here, the engine coolant discharge channel d maintains a closed state due to the closed third valve V3.

Therefore, the second coolant, moved from the heat exchange pipe 15 to the extra cooler 20 through the discharge Hue 21 and the coolant discharge channel c, exchanges heat with outside air inhaled to the engine 13 by rotation of the cooling fan 10 so as to cool the coolant down. The second coolant having exchanged heat with outside air by the extra cooler 20 is moved to the additional coolant tank 18 through the coolant supply channel a.

At step S40, it. is determined whether the temperature of the urea solution in the urea solution tank 14 is equal to or lower than the set temperature by the controller, and when the detected temperature of the urea solution is equal to or lower than the set temperature, step S50 follows, whereas the detected temperature of the urea solution exceeds the set temperature, determining whether the temperature of the urea solution in the urea solution tank 14 is equal to or lower than the set temperature is repeated.

At step S50, when the detected temperature of the urea solution is equal to or lower than the set temperature, the first coolant is supplied to the heat exchange pipe 15 of the urea solution tank 14 and the second valve V2 and the third valve V3 are opened, and the first valve V1 is closed so as to exchange heat with the urea solution in the urea solution tank 14.

Therefore, the first coolant is supplied to the heat exchange pipe 15 of the urea solution tank 14 through the engine coolant supply channel b, the opened second valve V2, and the supply line 17 by driving of the coolant pump 11.

The heat exchange between the first coolant supplied to the heat exchange pipe 15 of the urea solution tank 14 and the urea solution in the urea solution tank 14 increases the temperature of the urea solution so the urea solution in the urea solution tank 14 is maintained at the set temperature.

The first coolant of the heat exchange pipe 15 having exchanged heat with the urea solution in the area solution tank 14 is moved to the coolant pump 11 through the discharge line 21, the opened third valve V3 and the engine coolant discharge channel d.

The first coolant, moved from the heat exchange pipe 15 to the coolant pump 11 through the discharge line 21 and the engine coolant discharge channel d, cools down by the main cooler 12 exchanging beat with outside air inhaled to the engine 13 the rotation of the cooling fan 10.

When the process proceeds to step S50, the control process from the steps S20 to S50 repeats.

Referring to FIG. 2, the valve configured to be opened or closed in order to supply the first coolant and the second coolant of the additional coolant tank 18 to the heat exchange pipe 15 of the urea solution tank 14 through the supply line 17, or to discharge the first coolant and the second coolant front the heat exchange pipe 15 of the urea solution tank 14 through the discharge line 21 may include:

a first 3-way valve 22 changing between a first open position supplying the second coolant from the additional coolant tank 18 to the heat exchange pipe 15 of the urea solution tank 14 through the supply line 17 by driving of the water pump 19 and a second open position supplying the first coolant to the heat exchange pipe 15 of the urea solution tank 14 by driving of the coolant pump 11 and a second 3-way valve 23 changing between a first open position moving the second coolant, discharged through the discharge line 21 after heat is exchanged between the heat exchange pipe 15 of the urea solution tank 14 and the urea solution contained therein, to the extra cooler 20 and a second open position moving the first coolant, discharged through the discharge line 21 after heat is exchanged between the heat exchange pipe 15 of the urea solution tank 14 and the urea solution contained therein, to the coolant pump 11.

According to the embodiment as described above, when the detected temperature of the urea solution in the urea solution tank 14 by the temperature, sensor exceeds the set temperature so it is needed to supply the second coolant in the additional coolant tank 18 to the heat exchange pipe 15 of the urea solution tank 14, the first 3-way valve 22 and the second 3-way valve 23 change to the first open position.

Therefore, the second coolant in the additional coolant tank 18 is supplied to the heat exchange pipe 15 of the urea solution tank 14 through the coolant supply channel a, the water pump 19, the first 3-way valve 22 changing to the first open position, and the supply line 17 by driving of die water pump 19. Therefore the second coolant supplied to the heat exchange pipe 15 exchanges heat with the urea solution in the urea solution tank 14, thereby cooling the urea solution down to the set temperature.

The second coolant of the heat exchange pipe 15 that has exchanged heat with the urea solution in the urea solution tank 14 is moved to the extra cooler 20 through the discharge line 21, the second 3-way valve 23 changing to the first open position, and the coolant discharge channel c.

On the other hand, when the detected temperature of the urea solution in the urea solution tank 14 by the temperature sensor is equal to of lower than the set temperature so it is needed to supply the first coolant to the heat exchange pipe 15 of the urea solution tank 14, the first 3-way valve 22 and the second 3-way valve 23 change to the second open position.

Therefore., the first coolant is supplied to the heat exchange pipe 15 of the urea solution tank 14 through the engine coolant supply channel b, the first 3-way valve 22 changing to the second open position, and the supply line 17 by driving of the coolant pump 11. Therefore, the first coolant supplied to the heat exchange pipe 15 exchanges heat with the urea solution in the urea solution tank 14, thereby increasing the temperature of the urea solution and maintaining the urea solution at a set temperature.

On the other hand, the first coolant of the heat exchange pipe 15 that has exchanged heat with the urea solution in the urea solution tank 14 is moved to the coolant pump 11 through the discharge line 21, the second 3-way valve 23 changing to the second open position, and the engine coolant discharge channel d.

As described above, the device for cooling and heating the urea solution according to the second embodiment of the present invention has same elements with the device for cooling and heating the urea solution shown in FIG. 1 except the first 3-way valve 22 and the second 3-way valve 23, so a detailed description of those elements is omitted and the same reference numerals are used.

Referring to FIG. 4, another embodiment of the present invention provides a control method of a device for cooling and heating a urea solution for a construction machine, wherein the device includes;

a cooling fan 10, a coolant pump 11, and a main cooler 12, which are provided to an engine 13;

a urea solution tank 14 storing the urea solution and having an embedded heat exchange pipe 15 through which a first coolant (indicating engine coolant) or a second, coolant (indicating coolant cooler than the engine coolant) circulates;

an additional coolant tank 18 storing the second coolant cooling the urea solution stored in the urea solution tank 14;

a water pump 19 supplying the second coolant from the additional coolant tank 18 to the heat exchange pipe 15 through the supply line 17;

an extra cooler 20 dissipating heat of the second coolant by heat exchange with outside air, the second coolant exchanging heat with the urea solution of the urea solution tank 14;

a temperature sensor (not shown) detecting a temperature of the urea solution in the urea solution tank 14;

a first valve V1 configured to be opened or closed in order to supply the second coolant in the additional coolant tank 18 to the heat exchange pipe 15 of the urea solution tank 14 through the supply line 17;

a second valve V2 configured to be opened or closed in order to supply the first coolant to the heat exchange pipe 15 of the urea solution tank 14 through the supply line 17;

a third valve V3 configured to discharge the first coolant and the second coolant from the heat exchange pipe 15 of the urea solution tank 14 through the discharge line 21 after heat exchange with the urea solution contained therein;

a controller (not shown) receiving a detection signal of the urea solution in the urea solution tank 14 which is detected by the temperature sensor, and wherein, the control method includes;

checking a closed state of the first valve V1, the second valve V2, and the third valve V1 and an OFF state of the water pump 19 (S10);

determining whether the detected temperature of the urea solution in the urea solution tank 14 exceeds atmospheric temperature (S20A);

opening the first valve V1 and closing the second valve V2 and third valve V3 so as to supply the second coolant of the additional coolant tank 18 to the heat exchange pipe 15 of the urea solution tank 14 through the coolant supply channel a, the water pump 19, the first valve V1, and the supply line 17 and so as to move the second coolant having exchanged heat with the urea solution in the urea solution tank 14 to the extra cooler 20 through the discharge line 21 and the coolant discharge channel c when the detected temperature of the urea solution exceeds atmospheric temperature (S30);

determining whether the detected temperature of the urea solution is equal to atmospheric temperature (S40A);

closing the first valve V1 and opening the second valve V2 and third valve V3 so as to supply the first coolant to the heat exchange pipe 15 of the urea solution tank through the engine coolant supply channel b, the second valve V2, and the supply line 17 and so as to move the first coolant having exchanged heat with the urea solution of the urea solution tank 14 to the coolant pump 11 through the discharge line 21, the third valve V3, and the engine coolant discharge channel d when the detected temperature of the urea solution is equal to atmospheric temperature (S50).

According to the construction as described above, the control method has the same steps with the control method of the device for cooling and heating the urea solution shown in FIG, 3 except determining whether the temperature of the urea solution in the urea solution tank 14 detected by the temperature sensor exceeds atmospheric temperature (S20A) and determining whether the detected temperature of the urea solution is equal to atmospheric temperature (S40A), so a detailed description of those steps will be omitted and the same reference numerals will be used.

While the present invention has been described in connection with the specific embodiments illustrated in the drawings, they are merely illustrative, and the invention is not limited to these embodiments. It is to be understood that various equivalent modifications and variations of the embodiments can be made by a person having an ordinary skill in the art without, departing from the spirit and scope of the present invention. Therefore, the true technical scope of the present invention should not be defined by the above-mentioned embodiments but should be defined by the appended claims and equivalents thereof.

According to the present invention constructed above, the device rnaintains the urea solution of the urea solution tank, injected to the exhaust gas of the exhaust pipe, at the appropriate temperature to reduce the nitrogen oxides of the exhaust gas discharged from the diesel engine, thereby enabling the construction machine to be operated continually.

The invention claimed is:

1. A device for cooling and heating a urea solution for a construction machine, the device comprising:
an engine including a cooling fan, a coolant pump, and a main cooler;
a urea solution tank storing the urea solution and provided with an embedded heat exchange pipe through which first coolant or second coolant circulates;
an additional coolant tank storing the second coolant for cooling the urea solution stored in the urea solution tank;
a water pump supplying the second coolant from the additional coolant tank to the heat exchange pipe;
a valve configured to be opened or closed in order to supply the first coolant by driving of the coolant pump and the second coolant of the additional coolant tank by driving of the water pump to the heat exchange pipe of the urea solution tank through a supply line, and in order to move the first coolant and the second coolant, which are heat-exchanged at the heat exchange pips of the urea solution tank, to the coolant pump and to the additional coolant tank, respectively; and
a controller outputting drive: signals to a driver of the water pump in order to supply the second coolant of the additional coolant, tank by the water pump through the valve and the supply line when a temperature of the urea solution in the urea solution tank exceeds a set temperature and to a driver of the coolant pump in order to supply the first coolant by the coolant pump to the heat exchange pipe of the urea solution tank through the valve and the supply line when the temperature of the urea solution in the urea solution tank is equal to or lower than the set temperature, and opening or closing the valve.

2. The device of claim 1, further comprising:
an extra cooler dissipating heat of the second coolant by heat exchange with outside air, the second coolant being supplied to the heat exchange pipe of the urea solution tank, exchanging heat with the urea solution contained therein, and then being moved to the additional coolant tank.

3. The device of claim 1, wherein the valve comprises:
a first valve configured to be opened when supplying the second coolant from the additional coolant tank to the heat exchange pipe of the urea solution tank through the supply line by driving of the water pump and configured to be closed when supplying the first coolant to the heat exchange pipe of the area solution tank by driving of the coolant pump,
a second valve configured to be closed when supplying the second coolant: from the additional coolant tank to the heat exchange pipe of the urea solution tank through the first valve and the supply line and configured to be opened when supplying the first coolant to the heat exchange pipe of the urea solution tank through the supply line by driving of the coolant pump, and
a third valve configured to moves the second coolant, discharged from the heat exchange pipe of the urea solution tank through the discharge line after heat exchange with the area solution contained therein, to the extra cooler when closed to supply the second coolant in the additional coolant tank to the heat exchange pipe of the urea solution, tank through the first valve and the supply line, and configured to move the first coolant, discharged from the heat exchange pipe of the urea solution tank through the discharge line after heat exchange with the urea solution contained therein, to the coolant pump when opened to supply the first coolant to heat exchange pipe of the urea solution tank through the second valve and the supply line.

4. The device of claim 3, wherein the first valve, the second valve, and the thnird valve are configured as solenoid valves changing between an initial state closing a coolant supply channel and an engine coolant supply channel, which are selectively connected with the supply line, and closing an engine coolant discharge channel connected with the discharge line and an ON state opening the coolant supply channel, the engine coolant supply channel, and the engine coolant discharge channel in response to an input electrical signal.

5. The device of claim 1, wherein the urea solution tank is provided with
a temperature sensor detecting the temperature of the urea solution in the urea solution tank and outputting a detection signal to the controller.

6. The device of claim 1, wherein the valve comprises
a first 3-way valve changing between a first open position supplying the second coolant from the additional coolant tank to the heat exchange pipe of the urea solution tank through the supply line by driving of the water pump and a second open position supplying the first coolant to the heat exchange pipe of the urea solution tank by driving of the coolant pump and
a second 3-way valve changing between a first open position moving the second coolant, discharged from the heat exchange pipe of the urea solution tank through the discharge line after heat exchange with the urea solution, contained therein, to the extra cooler and a second open position moving the first coolantf. discharged from the heat exchange pipe of the urea solution tank through the discharge line after heat exchange with the urea solution, to the coolant pump.

7. The device of claim 2, wherein the extra cooler is disposed in front of the main cooler to be cooled by heat exchange with outside air coaler than outside air supplied to the main cooler by driving of the cooling fan.

8. The device of claim 1, wherein the first coolant is engine coolant and the second coolant is coolant cooler than the engine coolant.

9. A control method of a device for cooling and heating a urea solution for a construction machine, wherein the device includes:
an engine including a cooling fan, a coolant pump, and a main cooler;
a urea solution tank storing the unrea solution and provided with an embedded heat exchange pipe through which first coolant or second coolant circulates;
an additional coolant tank storing the second coolant cooling the urea solution stored in the urea solution tank;

a water pump supplying the second coolant from the additional coolant tank to the heat exchange pipe;

an extra cooler dissipating heat of the second coolant, discharged after heat exchange with the urea solution of the urea solution tank, by heat exchange with outside air;

a temperature sensor detecting a temperature of the urea solution in the urea solution tank;

a first valve configured to supply the second coolant of the additional cool ant rank to the heat exchange pipe of the urea solution tank through the supply line;

a second valve configured to supply the first coolant to the heat exchange pipe of the urea solution tank through the supply line;

a third valve configured to discharge the first coolant and the second coolant from the heat exchange pipe of the urea solution tank through the discharge line after heat exchange with the urea solution contained therein; and a controller receiving a detection signal of the urea solution in the urea solution tank which is detected by the temperature sensor, wherein the control method comprises;

checking a closed state of the first valve, the second valve, and the third valve and an OFF state of the water pump;

determining whether the temperature of the urea solution in the urea solution tank detected by the temperature sensor exceeds a set temperature; and opening the first valve and closing the second valve and third valve so as to supply the second coolant of the additional coolant tank to the heat exchange pipe of the urea solution tank through the first valve and the supply line and so as to move the second coolant having exchanged heat with the urea solution of the urea solution tank to the extra cooler through the discharge line when the detected temperature of the urea solution exceeds the set temperature.

10. The control method of claim 9, further comprising:

closing the first valve and. opening the second valve and third valve so as to supply the first coolant to the heat exchange pipe of the urea solution, tank through, the second valve and the supply line and so as to move the first coolant having exchanged heat, with the urea solution of the urea solution tank to the coolant pump through the discharge line and the third valve when the detected temperature of the urea solution is equal to or lower than the set temperature.

11. The control method of claim 9, wherein the set temperature is atmospheric temperature.

12. The control method of claim 11, further comprising:

closing the first valve and opening the second valve and third valve so as to supply the first coolant to the heat exchange pipe of the urea solution tank through the second valve and the supply line and so as to move the first coolant having exchanged heat with the urea solution of the urea solution tank to the coolant pump through the discharge line and the third valve when the detected temperature of the urea solution is equal to atmospheric temperature.

* * * * *